United States Patent [19]

Cates et al.

[11] Patent Number: 4,951,739
[45] Date of Patent: Aug. 28, 1990

[54] THERMAL STORAGE WITH TUBULAR CONTAINERS OF STORAGE MEDIUMS

[75] Inventors: Robert E. Cates, Arnold; Vladimir Kaplan, Silver Spring, both of Md.

[73] Assignee: Baltimore Aircoil Company, Inc., Jessup, Md.

[21] Appl. No.: 149,353

[22] Filed: Jan. 28, 1988

[51] Int. Cl.⁵ ............................................. F28D 20/00
[52] U.S. Cl. .................................. 165/10; 165/104.11; 62/430; 62/435; 62/437; 126/400
[58] Field of Search ............... 165/10, 104.11; 62/430, 62/434, 435, 437; 126/436

[56] References Cited

U.S. PATENT DOCUMENTS

| | | | |
|---|---|---|---|
| 3,289,743 | 12/1966 | Biro | 165/10 |
| 4,114,600 | 9/1978 | Newton | 126/436 |
| 4,170,261 | 10/1979 | Laing et al. | 126/400 |
| 4,565,242 | 1/1986 | Yano et al. | 126/436 |

FOREIGN PATENT DOCUMENTS

| | | | |
|---|---|---|---|
| 3033014 | 6/1981 | Fed. Rep. of Germany | 165/10 |
| 74590 | 5/1982 | Japan | 165/10 |
| 188987 | 11/1982 | Japan | 165/10 |
| 33097 | 2/1983 | Japan | 65/10 |

*Primary Examiner*—Albert W. Davis, Jr.
*Attorney, Agent, or Firm*—Charles E. Bouton; Edward J. Brosius

[57] ABSTRACT

Tubular containers, preferably corrugated, containing plural thermal storage medium compositions having different fusion temperatures are arrayed in zones or layers within a vessel through which liquid is circulated to exchange heat with the containers.

17 Claims, 2 Drawing Sheets

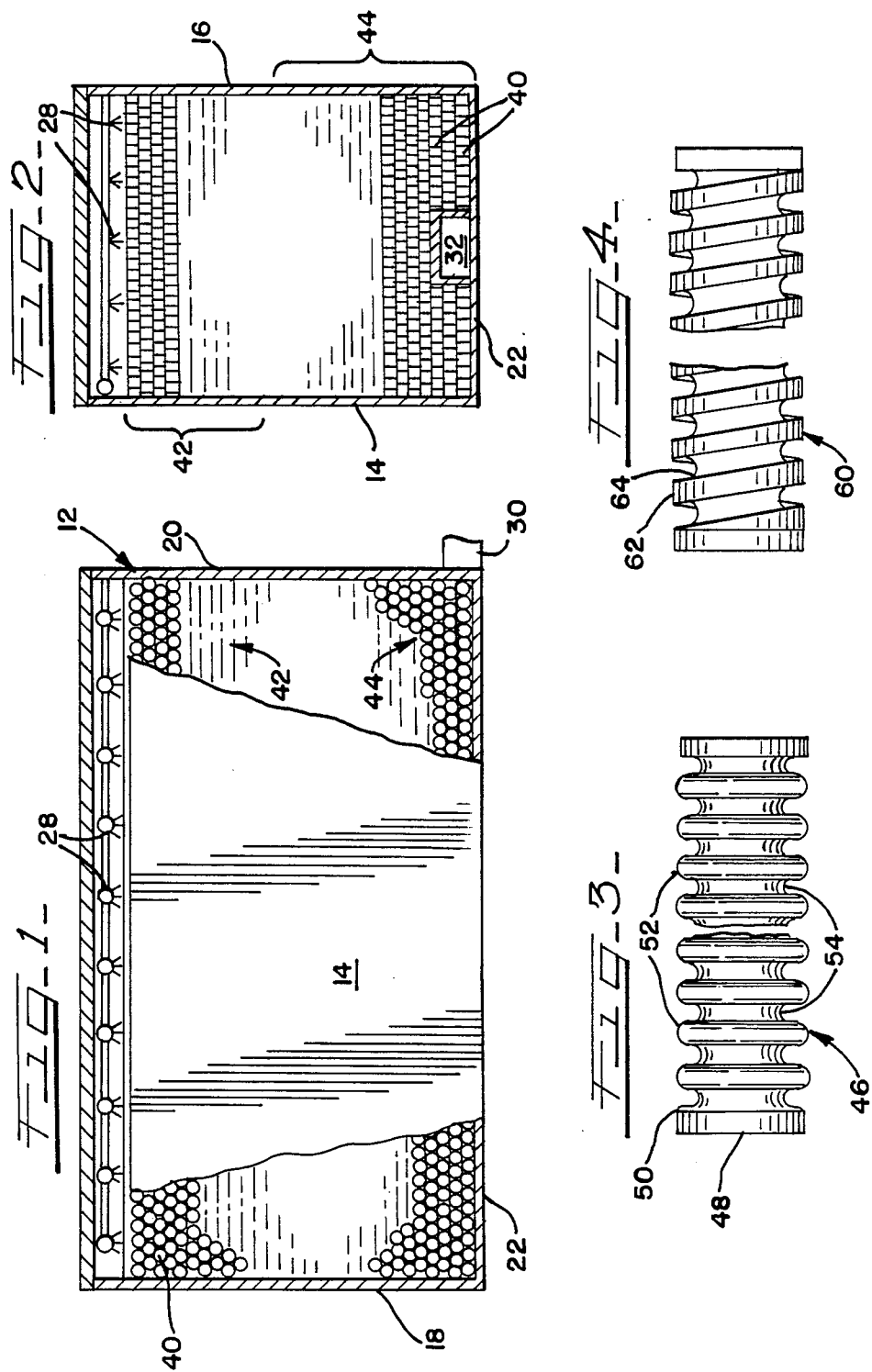

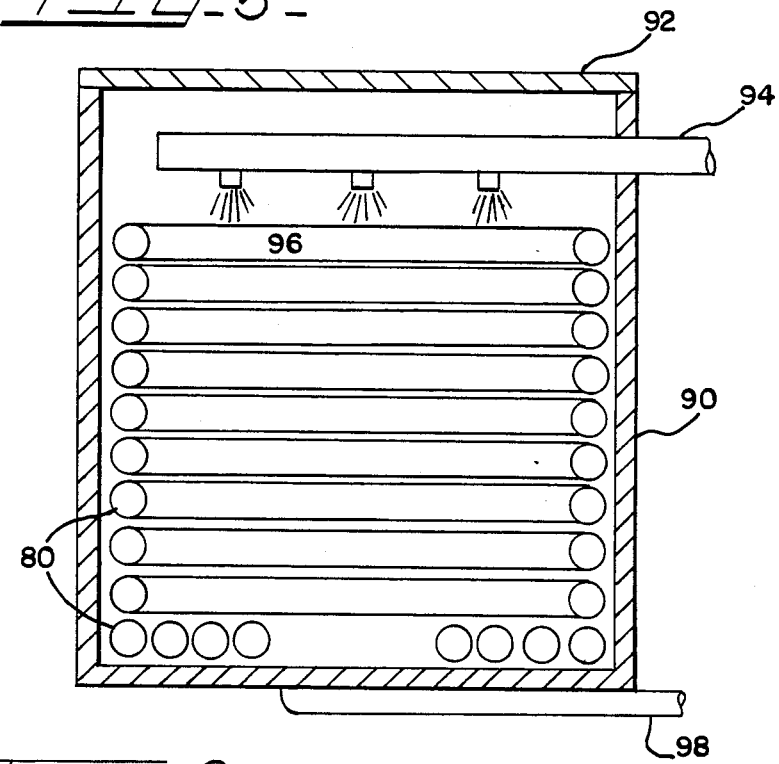
FIG-5-
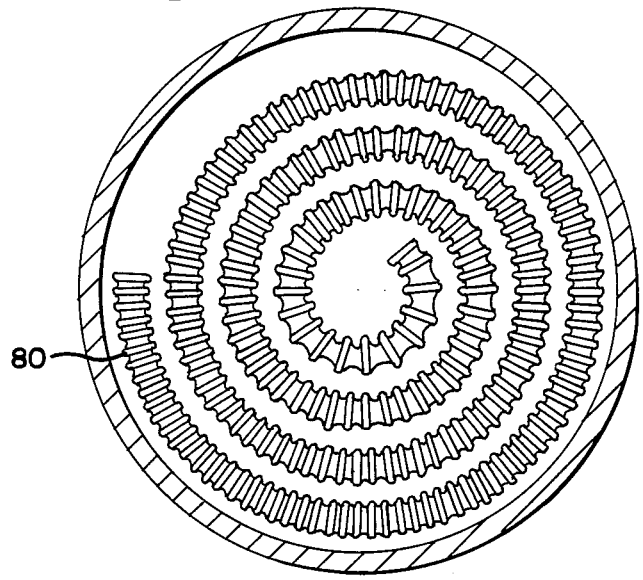
FIG-6-

THERMAL STORAGE WITH TUBULAR CONTAINERS OF STORAGE MEDIUMS

FIELD OF THE INVENTION

This invention relates to a method and apparatus for thermal storage and more specifically is directed to an improved method and apparatus for storing recoverable thermal units or latent thermal energy at one or more temperatures within tanks containing plural non-nestable corrugated form cylindrical containers.

1. Background

In known space conditioning systems it is often beneficial to minimize energy costs by storing thermal units when low cost energy is available and recovering the stored units during periods of high cost or when the source of energy is scarce or unavailable. By the term thermal units it is intended to mean quantities of either heat or cold (more correctly stated as the relative absence of heat).

In general the storage of thermal units is known for supplemental heating or cooling of residential and commercial space by the use of a quantity of a storage medium that may be heated or cooled, such as by exposure to solar heat during day light hours or by mechanical refrigeration during off peak electric energy hours (usually during the night) and then stored in a vessel and the medium employed later as a source of heat or cold. The efficiency or space requirements of such thermal storage is improved in applications where the fusion heat of a liquid medium (at phase change between liquid and solid) may be utilized. However, this may present problems to the extraction and recovery of stored heat or cold because such liquid medium is not flowable when it undergoes a phase change to solid form, and, although other temperatures may be preferred, there are practical limitations on the availability and usefulness of liquids that undergo phase change at temperatures other than 32° F., the freezing point of water.

2. The Prior Art

Attempts have been made to utilize thermal storage mediums other than water, such as Glauber's salt compositions (Sodium Sulfate Decahydrate - $Na_2SO_4 \cdot 10 H_2O$) and other known eutectic materials which may be designed to freeze at a range of desirable temperatures. Such attempts have generally involved confining quantities of such a medium in plural containers or conduits which are held immersed within a body of another liquid, usually water or a water-glycol solution, which is circulated to convey the thermal units to or from the containers and conduits. Examples of such are found in U.S. Pats. No. 2,677,664 to Telkes, No. 3,773,031 to Laing etal and No. 4,283,925 to Wildfeuer.

However, there have been a number of problems. Foremost is the difficulty in obtaining uniform liquid circulation about the containers or conduits, particularly when they are closely arrayed within the body of liquid to maximize the quantity of medium available for thermal storage. Additionally, the medium may tend to expand and contract during temperature change and fusion, raising the potential for breaking its confinement or requiring empty space to be left within the confinement which, in turn, lowers the efficiency of heat transfer to or from the medium within the confinement. Additionally, prior utilization of such confined thermal storage mediums are believed to have involved a single composition in multiple containers or conduits within a vessel resulting in certain operating inefficiencies.

SUMMARY OF THE PRESENT INVENTION

Accordingly, it is a principal object of the present invention to provide an improved method and apparatus for thermal storage having greater efficiency.

It is a further object of the present invention to provide an improved method and apparatus for thermal storage which maximizes the surface for thermal transfer to a storage medium held within confinements.

It is another object of the present invention to provide an improved method and apparatus for thermal storage which employs multiple thermal storage mediums having differing phase change temperatures.

Briefly stated the present invention involves the confinement of quantities of thermal storage medium in a plurality of corrugated form cylindrical tubes which are packed within a vessel wherein a liquid may be circulated to transfer thermal units to and from the tubes. The cylindrical form and corrugations provide optimum surface for heat transfer. The tube corrugations are sized to prevent nesting of raised portions of one tube within the indentations or valleys of an adjacent tube whereby multiple pathways in the corrugated valleys are assured for the circulated liquid. Preferably the tubes packed within a vessel are organized into multiple zones or strata wherein the thermal storage medium within tubes in one zone differ from the storage medium in another zone so as to advantageously accommodate the temperature differential that occurs between the entry and exit points for the circulated liquid.

BRIEF DESCRIPTION OF THE DRAWINGS

Further objects and advantages will be understood from the following detailed description of a preferred embodiment of the invention and the drawings wherein:

FIG. 1 is a side elevation view with parts broken away, of a plurality of cylindrical tubes containing thermal storage mediums, which tubes are closely packed within a liquid containing vessel;

FIG. 2 is an end elevation in section, of the apparatus of FIG. 1;

FIG. 3 is a side view of one form of a closed corrugated cylindrical tube useful in the vessel of FIGS. 1 and 2 wherein the corrugations are annular ribs;

FIG. 4 is a side view of another form of closed corrugated cylindrical tube wherein the corrugations are in the form of one or more helical flutes;

FIG. 5 is a side elevation of another embodiment of the present invention utilizing spiral tubes; and FIG. 6 is a plan view of the spiral tube of FIG. 5.

DETAILED DESCRIPTION OF THE INVENTION

According to the present method it is preferred to confine quantities of more than one thermal storage medium within zones or layers within a vessel where liquid is circulated across the quantities of storage medium so as to transfer thermal units (heat or cold) to or from the storage medium.

Glauber's salt compositions (sodium sulfate decahydrate $Na_2SO_4^{19} 10H_2O$) and other eutectic salt compositions may be utilized so long as the fusion temperature (phase change temperature) of the composition's differ in the respective zones. It will be understood that the liquid which is circulated through the vessel and across the zones of thermal storage mediums functions, according to a particular application and cycle, to either introduce or remove quantities of heat, and a temperature differential will exist between an entry point of the liquid and an exit point of the liquid.

It has been found that by employing two or more storage medium compositions in distinct zones or layers within the vessel of liquid, each composition having a different fusion temperature, it is possible to utilize the circulation liquid temperature differential to both maximize thermal storage capacity and to achieve a beneficial exit temperature useful in space conditioning systems and the like.

For instance where it is desired to store cold and discharge chilled liquid at the exit point of the vessel the thermal storage medium is chosen to have a relatively higher fusion temperature at a zone close to the liquid entry point and different compositions having successively lower fusion temperatures are selected for one or more additional zones in the direction of liquid flow to the exit point. It is often possible to adjust the storage medium compositions so that the fusion temperature at the zone closest to the liquid exit point is at or close to a temperature designed for use in an air conditioning system or heat transfer process being supplied with chilled liquid.

Thus during a storage cycle when cold thermal units are produced for storage (as by mechanical refrigeration of the circulated liquid) relatively colder liquid will be first counterflowed in a reverse direction from exit point to entry point so as to first contact the lowest fusion temperature storage medium and as the mechanically chilled liquid becomes warmer it contacts storage mediums of successively higher fusion temperatures. Normally each zone of storage medium will equilibrate at the respective fusion temperatures where the greatest absorption of heat units will occur at phase change. Thereafter when the liquid flow is reversed to supply chilled liquid it will be gradually cooled as it transits each successive storage medium zone and, depending on the rate of liquid flow and initial temperature, will approach and may attain the lowest fusion temperature designed into the system.

Preferably the plural zones are obtained by confining two or more thermal storage medium compositions in tubular units which are segregated into zones or layers within a vessel. The tubular units are desirably short cylindrical lengths which are packed within the vessel. It is possible to randomly dispose such tubular units in each respective zone; however, the quantity of storage medium in each zone may be maximized by uniformly arranging the tubular units in parallel. Furthermore, the surface area available for heat transfer to and from the storage medium is preferably maximized by corrugating the tubular surface.

Suitable apparatus to carry out the foregoing method is shown in the Figures. A vessel 12 having side walls 14, 16 end walls 18, 20 and bottom 22 is provided with liquid introduction orifices 28, or the like, and an exit or discharge pipe 30 is located at a point remote from the sprays. As illustrated in FIGS. 1 and 2, the liquid orifices 28 are positioned above an open top of the vessel 12 and liquid introduced through the orifices 28 flows downwardly to a collector trough 32 at the bottom 22 of the vessel which is connected to the exit pipe 30. Liquid may also be circulated in an opposite direction. However, it would be equally effective to provide horizontal liquid flow from end to end or side to side of the vessel. If desired the top of the vessel 12 may also be enclosed.

The vessel is essentially filled with tubes generally 40, each of which contains a quantity of one thermal storage medium. In the preferred form of the invention the tubes are arrayed in plural layers 42, 44 (or zones) and all such tubes within one layer 42 contain quantities of a first storage medium of one composition and all of the tubes within another layer 44 contain quantities of a second storage medium of a different composition having a different fusion temperature. The tubes 40 comprise a large plurality of closed corrugated cylinders 46 which are of lengths no greater than the interior width of the vessel 12. Preferably the corrugations encircle the tubes.

As shown in FIG. 3 each cylinder 46 has a plug 48 at each end and the cylindrical wall 50 is made up of outwardly extending annular ribs 52 and inwardly extending valleys 54 so as to maximize the surface area available to transfer heat to or from the storage medium contained therein. The corrugations of ribs 52 and valleys 54 also may flex slightly to allow for lengthwise expansion and contraction induced by temperature and phase changes. It is also preferred that the ribs 52 be of a dimension (in the axial direction of the cylinder 46) slightly greater than the similar dimension of the valleys 54 so as to prevent the nesting of adjacent cylinders when packed within the vessel 12. This serves to maintain uniform flow passages for the liquid circulated through the vessel 12.

Another form of corrugated cylinder 60 is shown in FIG. 4 wherein the corrugations are in the form of one or more helical flutes 62 and corresponding helical valleys 64. Such helical corrugations will flex and allow for expansion and contraction and the helical form of the flutes 62 will inherently resist nesting of cylinders 60 where the end plugs are maintained essentially in a common plane.

Either form of cylinder 46, 60 may be made of thin wall metal or, more economically and without corrosion potential, made of plastic such as high density polyethylene so as to be slightly flexible as aforedescribed. In practice it has been found that plastic tubes having an inner diameter (inside valleys) of about 2 inches and outer diameter (outside ribs or flutes) of about 2.45 inches and a length slightly less than the width of vessel 12 are functionally efficient. Annular ribs of about 0.214 inch width (at midpoint) and valleys 0.194 inch wide (in axial direction) will not nest. Such cylinders may be fully filled with a preferred storage medium before the ends are closed and no slack need be provided for expansion of the medium therein. Alternatively mediums may be filled to appropriate levels to leave space for potential volumetric expansion needs (due to temperature and phase change) without significantly affecting internal pressure. It is also possible to produce the aforedescribed cylinders with sufficiently flexible corrugations to permit the cylinder to be axially compressed to reduce its volume during filling and sealing and then allowing the sealed cylinder to reexpand so as to provide an evacuated interior space into which the storage medium may expand.

Another embodiment of the invention is illustrated in FIGS. 5 and 6 wherein the tubular units are closed tube spirals 80 with spaces left between adjacent outer wall surfaces. Such tube spirals 80 may be smooth walled or corrugated and may be stacked in a vessel containing a liquid pool so as to permit the liquid to flow vertically between respective spiral turns and between the outer spiral turns and vessel walls. Where such tube spirals 80 are utilized the vessel 90 may be cylindrical and of an inner diameter slightly greater than the maximum dimension across a tube spiral unit. Preferably the vessel 90 is slightly conical so as to diverge from bottom to top so as to facilitate loading and unloading of the tube spirals 80. The vessel 90 is also equipped with a top or cover 92, inlet manifold 94 with liquid orifices 96, and an outlet manifold 98 extending across at least a portion of the vessel bottom. In a fashion similar to the preceding embodiments, the tube spirals 80 are filled with selected storage mediums and sealed and the respective tube spirals 80 are stacked in layers in the vessel 90.

The foregoing detailed description has been given for clearness of understanding and to provide a complete description of a preferred embodiment of the invention. Various modifications may be made without departing from the spirit and scope of the invention which is defined in the following claims.

We claim:

1. An improved method for storing thermal units, said method comprising:
   confining quantities of plural thermal storage medium compositions in a plurality of tubes, said tubes being uniformly corrugated with successive ribs and valleys of dimensions that prevent nesting of adjacent tubes,
   arraying said tubes substantially parallel and adjacent one another within a vessel in distinct zones with the ribs of adjacent tubes contacting one another and the tubes in one zone containing a thermal storage medium composition that differs from the thermal storage medium composition contained in tubes within an adjacent zone,
   and circulating liquid through said vessel in a direction transverse to the said tubes through the corrugation valleys and proceeding sequentially through said zones.

2. The method of claim 1 wherein each said thermal storage medium is of a different phase change temperature.

3. The method of claim 2 wherein said thermal storage mediums are arranged in distinct zones in the order of the respective phase change temperatures parallel to the liquid flow.

4. The method of claim 3 wherein the order of said phase change temperatures is sequentially descending in the direction of liquid flow when said liquid is to be chilled as it circulates through said vessel.

5. The method of claim 1 wherein said tubes are in the form of spirals.

6. The method of claim 1 wherein the thermal storage mediums are selected from a group comprising water, eutectic salts, salt-hydrates and mixtures thereof.

7. The method of claim 1 wherein the tubes are cylindrical and the corrugations are annular.

8. The method of claim 1 wherein the tubes are cylindrical and the corrugations are helical.

9. An improved thermal storage device comprising:
   a vessel for containing a body of fluid;
   fluid introduction means positioned to deliver fluid to said vessel;
   fluid circulation means positioned to remove fluid from said vessel;
   and a plurality of substantially parallel tubular containers ranged substantially parallel and adjacent one another throughout said vessel, each of said tubular containers being uniformly corrugated with successive ribs and valleys of dimensions that prevent nesting of adjacent tubes whereby to provide for fluid flow transverse to said tubular containers within said vessel through the corrugating valleys and each said tubular container confining a quantity of a thermal storage phase change medium having a fusion temperature different from the freezing temperature of the said body of fluid.

10. The apparatus of claim 9 wherein the tubes are cylinders having annular ribs and valleys.

11. The apparatus of claim 9 wherein the tubes are cylinders having helical flutes and valleys.

12. The apparatus of claim 10 wherein said cylinders are arranged parallel to one another and wherein said ribs are of an axial dimension greater than the axial dimension of said valleys.

13. The apparatus of claim 9 wherein said tubular containers are in the form of spirals.

14. The apparatus of claim 9 wherein said vessel is generally cylindrical and said tubular containers are in the form of spirals stacked within said vessel.

15. The apparatus of claim 9 wherein said thermal storage phase change medium is selected from a group comprising water, eutectic salts, salt-hydrates and mixtures thereof.

16. The apparatus of claim 9 wherein said tubular containers are arrayed in plural zones and each container in one zone contains a quantity of a thermal storage phase change medium having a fusion temperature which is different from the fusion temperature of the phase change medium contained in said tubular containers in an adjacent zone.

17. The apparatus of claim 8 wherein said tubular containers are arrayed in plural zones with a first thermal storage medium having a first fusion temperature confined within each said containers within one zone and with a second thermal storage medium having a second fusion temperature different from said first temperature confined within each of said containers within another zone.

* * * * *